(12) United States Patent
Zhu et al.

(10) Patent No.: US 10,606,845 B2
(45) Date of Patent: Mar. 31, 2020

(54) DETECTING LEADING SESSION OF APPLICATION

(71) Applicant: Beijing Zhigu Rui Tuo Tech Co., Ltd, Beijing (CN)

(72) Inventors: Hengshu Zhu, Beijing (CN); Kuifei Yu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 517 days.

(21) Appl. No.: 15/028,017

(22) PCT Filed: Oct. 9, 2014

(86) PCT No.: PCT/CN2014/088235
§ 371 (c)(1),
(2) Date: Apr. 7, 2016

(87) PCT Pub. No.: WO2015/051749
PCT Pub. Date: Apr. 16, 2015

(65) Prior Publication Data
US 2016/0253327 A1 Sep. 1, 2016

(30) Foreign Application Priority Data
Oct. 10, 2013 (CN) .......................... 2013 1 0469917

(51) Int. Cl.
*G06F 7/00* (2006.01)
*G06F 17/30* (2006.01)
(Continued)

(52) U.S. Cl.
CPC .... *G06F 16/24578* (2019.01); *G06F 16/2477* (2019.01); *G06Q 30/0278* (2013.01); *G06Q 30/0282* (2013.01); *H04W 4/60* (2018.02)

(58) Field of Classification Search
CPC .......... G06F 17/3053; G06F 17/30551; G06F 16/24578; G06F 16/2477; G06Q 30/0282; G06Q 30/0278
(Continued)

(56) References Cited

U.S. PATENT DOCUMENTS 5,819,226 A  10/1998 Gopinathan et al.
8,082,349 B1 * 12/2011 Bhargava ........... G06Q 30/0185
709/203
(Continued)

FOREIGN PATENT DOCUMENTS

CN 101408883 A 4/2009
CN 101441730 A 5/2009
(Continued)

OTHER PUBLICATIONS

Office Action dated Jan. 26, 2018 for U.S. Appl. No. 15/028,015, 74 pages.
(Continued)

*Primary Examiner* — Md I Uddin
(74) *Attorney, Agent, or Firm* — Amin, Turocy & Watson, LLP

(57) ABSTRACT

This application provides a method and system for detecting a leading session of an application. The method comprises: a leading event detection step of detecting leading events of the application based on historical ranking information; and a leading session detection step of combining adjacent leading events to form the leading session. The method and system in this application can automatically detect, from information about an application leaderboard, application leading sessions in which an application is popular with users so as to provide a data basis for analyzing and processing an application service.

32 Claims, 7 Drawing Sheets

(51) Int. Cl.
*G06F 16/2457* (2019.01)
*G06F 16/2458* (2019.01)
*G06Q 30/02* (2012.01)
*H04W 4/60* (2018.01)

(58) Field of Classification Search
USPC .............................. 707/725, 733, 751, 741
See application file for complete search history.

(56) References Cited

U.S. PATENT DOCUMENTS

| | | | |
|---|---|---|---|
| 9,460,461 B1* | 10/2016 | Gill | G06Q 30/0623 |
| 9,794,106 B1 | 10/2017 | Zhu et al. | |
| 2008/0249798 A1 | 10/2008 | Tulshibagwale | |
| 2011/0078151 A1 | 3/2011 | Wen et al. | |
| 2011/0119218 A1 | 5/2011 | Lay et al. | |
| 2012/0117504 A1 | 5/2012 | Lemay et al. | |
| 2013/0185315 A1* | 7/2013 | Hao | G06Q 30/02 707/751 |
| 2014/0230053 A1 | 8/2014 | Mote et al. | |

FOREIGN PATENT DOCUMENTS

| | | |
|---|---|---|
| CN | 101809972 A | 8/2010 |
| CN | 102279786 A | 12/2011 |
| CN | 102880603 A | 1/2013 |
| CN | 103136435 A | 6/2013 |
| CN | 103177109 A | 6/2013 |
| CN | 103530796 A | 1/2014 |
| CN | 103559208 A | 2/2014 |
| CN | 103559210 A | 2/2014 |
| CN | 103577541 A | 2/2014 |
| CN | 103577542 A | 2/2014 |
| CN | 103577543 A | 2/2014 |
| CN | 103761228 A | 4/2014 |
| JP | 2004227428 A | 8/2004 |

OTHER PUBLICATIONS

International Search Report dated Jan. 21, 2015 for PCT Application No. PCT/CN2014/088245, 3 pages.
International Search Report dated Jan. 21, 2015 for PCT Application No. PCT/CN2014/088238, 2 pages.
Dan Wang, "Research on Digging Technology of Opinion Leader based on Internet Forum", Collected Papers of Best Master Paper in China, 2012. 29 pages.
Xie, et al. "Review Spam Detection via Temporal Pattern Discovery" KDD'12, Aug. 12-16, 2012, Beijing, China. 9 pages.
Hai-Xia, et al. "Detection of Fake Reviews Based on Adaptive Clustering", Journal of Nanjing University (Natural Sciences), vol. 49, No. 4, Jul. 2013, 6 pages.
Dan Wang, "Research of Opinion Leader Discovery Technology in BBS" Dissertation for the Master Degree in Engineering, Harbin Institute of Technology, Jun. 2011, 32 pages.
Zhuang Minghao. "About Cheating on Rankings" TMT Salon Note, Nov. 1, 2012, published online at [https://www.huxiu.com/article/5382.html], 10 pages.
International Search Report dated Jan. 8, 2015 for PCT Application No. PCT/CN2014/088235, 2 pages.
"Matlab Answers—how to find first crossing of a threshold, then ignore n datapoints after?" Oct. 2014, (www.mathworks.com/matlabcentral/answers/160440-how-to-find-first-crossing-of-a-threshold-then-ignore-n-datapoints-after), retrieved on May 17, 2018, 3 pages.
Office Action dated May 17, 2018 for U.S. Appl. No. 15/026,961, 50 pages.
Office Action dated Aug. 3, 2018 for U.S. Appl. No. 15/028,015, 09 pages.
Office Action dated Oct. 17, 2018 for U.S. Appl. No. 15/026,961, 54 pages.

* cited by examiner

DETECTING LEADING SESSION OF APPLICATION

RELATED APPLICATION

The present application is a U.S. National Stage filing under 35 U.S.C. § 371 of international patent cooperation treaty (PCT) application No. PCT/CN2014/088235, filed Oct. 9, 2014, and entitled "DETECTING LEADING SESSION OF APPLICATION", which claims the benefit of priority to Chinese Patent Application No. 201310469917.1, filed on Oct. 10, 2013, which applications are hereby incorporated into the present application by reference herein in their respective entireties.

TECHNICAL FIELD

This application relates to the field of networks, and in particular, to detecting a leading session of an application.

BACKGROUND

In recent years, a user application, especially, a mobile application, installed and operated in a mobile terminal, develops rapidly. In order to make it convenient for a user to select and install an application, many application websites or application stores provide services on an application collectively, such as, a search service, a download service and a rating service, and also publish an application leaderboard regularly, for example, every day, to present some applications popular with users currently. In fact, the leaderboard is a valued means to prompt applications. An application with a high ranking in the leaderboard generally stimulates a large number of users to download the application, which brings a large economic income for an application developer.

And, from the technical perspective, a ranking of an application in the leaderboard represents the popularity of the application with users, and therefore, it is possible to learn about technical information, commercial information and the like, which are hidden behind these applications popular with users, by analyzing data related to the leaderboard, such as a development trend of a related technical field, an operation mode of a commercial advertisement, and even a ranking fraud to obtain a false high ranking in the leaderboard in a fraudulent manner. However, the prior art lacks studies on information about an application leaderboard, and moreover, lacks technologies for analyzing and processing information about an application leaderboard.

SUMMARY

An objective of this application is to provide a technology for analyzing and processing information about an application leaderboard, which can automatically detect related information in a specific period during which an application is popular with users, thereby providing a data basis for analyzing and processing an application service.

According to one aspect of this application, a method for detecting a leading session of an application is provided. The method comprises:

a leading event detection step of detecting leading events of the application based on historical ranking information; and a leading session detection step of combining adjacent leading events to form the leading session of the application.

According to another aspect of this application, a system for detecting a leading session of an application is further provided. The system comprises:

a leading event detection unit, configured to detect leading events of the application based on historical ranking information; and a leading session detection unit, configured to combine adjacent leading events to form the leading session of the application.

Methods and systems and other embodiments in this application can automatically detect, from information about an application leaderboard, application leading sessions in which an application is popular with users so as to provide a data basis for analyzing and processing an application service.

DETAILED DESCRIPTION

Embodiments of this application are described in further detail below with reference to various embodiments and the accompanying drawings. The following embodiments are used for describing this application, but not intended to limit the scope of this application.

This application performs a study aimed at a technical problem related to information about an application leaderboard, and therefore persons skilled in the art should understand an "application" in this application in a broad sense. The application comprises various programs or files which may be published on the Internet for users to download, rate, and execute, that is, the application comprises a traditional application operated in a personal computer and a mobile application operated in a mobile terminal, also comprises multimedia files which can be downloaded and played, such as a picture file, an audio file and a video file.

It is found according to an analysis by the applicant that, an application cannot remain popular with users for a long time and occupy a very high ranking in the leaderboard for a long time, and relatively high ranking situations only occur collectively in a relatively short period as some independent events. In this application, a period during which an application remains in a relatively high ranking may be referred to as a "leading event" of the application, and a period during which a leading event occurs frequently may be referred to as a "leading session" of the application. That is, a phenomenon that an application is popular with users just occurs within the leading session.

An operator of an application store has historical ranking information of an application, and the historical ranking information can be obtained from the operator of the application store directly, or by analyzing and processing information about an application leaderboard continuously published by the operator of the application store in a relatively long historical period, the historical ranking information of the application can also be obtained. Because the historical ranking information of the application records historical information about an application ranking and related rating information, a leading event and a leading session of each application can be detected on the basis of the historical ranking information in an embodiment of this application.

Figure 1:
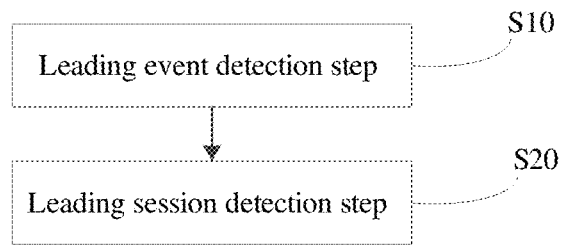
FIG. 1 is a flowchart of a method for detecting a leading session of an application according to an embodiment of this application.

As shown in FIG. 1, a method for detecting a leading session of an application is provided in an embodiment of this application. The method comprises:

a leading event detection step S10 of detecting leading events of the application based on historical ranking information; and a leading session detection step S20 of combining adjacent leading events to form the leading session.

A process and functions of steps in the above detection method are described below with reference to the accompanying drawings.

Because historical ranking information is a data basis for detecting a leading session of an application in this application, the detection method, as an exemplary embodiment of this application, may further comprise a historical ranking information obtaining step of obtaining historical ranking information of the application in an application leaderboard.

An application leaderboard generally may show popular applications in top K rankings, such as top 1000 rankings. Moreover, an application leaderboard is generally updated regularly, for example, being updated every day. Therefore, each application a has historical ranking information. The historical ranking information may comprise a ranking index $R_a = \{r_1^a, \ldots, r_i^a, \ldots, r_n^a\}$ corresponding to a discrete date index. In the discrete date index, an interval between time points is fixed, that is, an update cycle of an application leaderboard. Thereof, $r_i^a$ is a ranking of the application a when time is $t_i$, and $r_i^a \in \{1, \ldots, K \ldots, +\infty\}$, and $+\infty$ represents that the application a is not in top K rankings in a leaderboard; n represents that the total number of time points corresponding to all historical ranking information. For example, in a case in which a leaderboard is updated every day, $t_i$ represents the $i^{th}$ day in the history and n is the total number of days corresponding to historical ranking information. It can be seen that, a smaller value of $r_i^a$ indicates a higher ranking of the application a in a leaderboard on the $i^{th}$ day.

After an application is published, any downloading user can rate it. Actually, a user rating is one of the most important characteristics for application promotion. An application with a higher rating can attract more users to download it, leading to a higher ranking of the application in a leaderboard. Hence, historical ranking information may further comprise information about rating on an application by users of the application in each time segment in the history.

In the historical ranking information obtaining step, the historical ranking information can be obtained in various manners. For example, the historical ranking information can be obtained from an operator of an application store directly, or can be extracted from data continuously published by an application store in a relatively long historical period.

S10: A leading event detection step: Detect leading events of the application based on the historical ranking information.

Figure 2A:
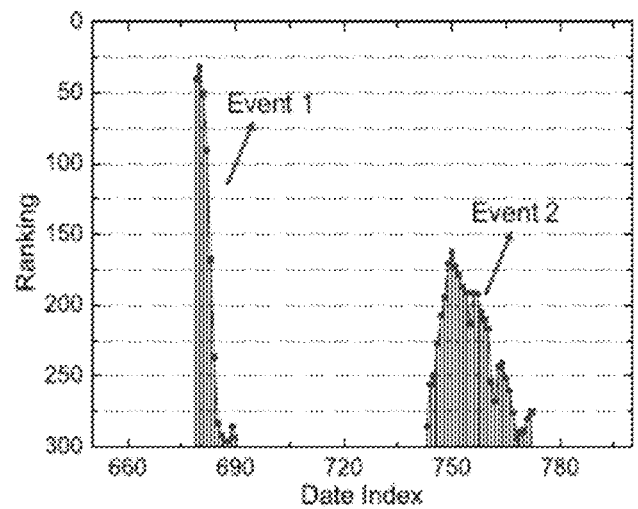
FIG. 2a shows an example of a leading event in an application leaderboard according to an embodiment of this application.

An application doesn't always occupy a high ranking in a leaderboard, and a period during which a ranking remains relatively high is a "leading event". FIG. 2a shows an example of a leading event of an application. In this figure, a lateral axis represents a date index corresponding to historical ranking information, a vertical axis represents a ranking of an application, and event1 and event2 in this figure represent two leading events of the application appeared in the history of ranking. Outlines of the two leading events are separately formed by connecting ranking points during a leading event.

In an embodiment of this application, a standard by which an application is in a relatively high ranking in the application leaderboard is that a ranking of the application is not greater than a ranking threshold K*. Because an application in top K* rankings in a leaderboard is considered as an application with a relatively high ranking, a time segment, in which a ranking of an application remains in top K* rankings, is considered as a leading event. The leading event starts from the time when the application starts to enter top K* rankings in a leaderboard, until the application is out of top K* rankings in the leaderboard.

Preferably, the method in the embodiment of this application may further comprise a step of setting the ranking threshold K*, so as to determine a standard by which an application is in a relatively high ranking in the application leaderboard. Because the total number K of applications in a leaderboard generally is very large, such as 1000, the above ranking threshold K* generally is less than the value of K. According to factors, such as the total number K of applications in an application leaderboard and analysis requirements of persons skilled in the art, the ranking threshold K* can take a value among for example, integers from 1 to 500. It can be understood by persons skilled in the art that, a smaller value of K* indicates a higher standard by which an application is considered to be in a relatively high ranking. In FIG. 2a, the value of K* is 300.

According to the above literal representations on a leading event, a leading event e of an application a can be represented in a formula below:

Given that a ranking threshold K* is taken as a standard for a relatively high ranking, where $K^* \in [1,K]$; a leading event e of an application a comprises a time range from a start time to an end time $T_e = [t_{start}^e, t_{end}^e]$, where a ranking of the corresponding application a satisfies $r_{start}^a \leq K^* < r_{start-1}^a$ and $r_{end}^a \leq K^* < r_{end+1}^a$, and $\forall t_k \in (t_{start}^e, t_{end}^e)$ satisfies $r_k^a \leq K^*$.

It can be seen from the above representations that detecting a leading event lies in detecting a start time and an end time of a period of time when an application remains in top K* rankings, and determining a period between a pair of start time and end time as a leading event can be performed. Therefore, in an embodiment of this application, the leading event detection step may further comprise the following steps:

A start time identification step S101: Identify a start time of a leading event from historical ranking information in this step. Specifically, in the start time identification step, a ranking of an application at each time point in historical ranking information is searched for in order, and when a ranking at a current time point is not greater than a ranking threshold K* and a ranking at a previous time point is greater than the ranking threshold K*, the current time point is identified as a start time of a leading event. It can be understood by persons skilled in the art that, because the history of ranking of an application may comprise multiple leading events, multiple start time points can be identified in the start time identification step.

An end time identification step S102: Identify an end time of a leading event from historical ranking information in this step. Specifically, in the end time identification step, a ranking of an application at each time point in historical ranking information is searched for in order, and when a ranking at a current time point is greater than the ranking threshold K* and a ranking at a previous time point is not greater than the ranking threshold K*, the previous time point is identified as an end time of a leading event. It can be understood by persons skilled in the art that, because the history of ranking of an application may comprise multiple leading events, multiple end time points can be identified in the end time identification step.

A leading event detection step S103: Identify a time segment between each start time and an adjacent end time after the start time as a leading event in this step, so as to detect all leading events of the application in the history of ranking.

It should be noted that, as a special situation, if an application is in top K* rankings at a first time point in an analyzed and processed historical period, for example, on a first day in a historical record, at this time, in the start time identification step S101, the first time point is defined as a start time. Similarly, if an application is still in top K* rankings at a last time point in an analyzed and processed historical period, for example, today, at this time, in the end time identification step S102, the last time point is defined as an end time.

S20: A leading session detection step: Combine adjacent leading events to form the leading session.

Through a further study, it is found that in some applications, multiple leading events adjacent to each other continuously appear in a period. The period is a "leading session" of an application in this application. It can be seen that, a leading session is formed by combining adjacent leading events. Specifically, that a time interval of two adjacent leading events is less than an interval threshold φ may be used as a standard for combing the two leading events in a same leading session, and the time interval of two adjacent leading events refers to an interval between an end time of a former leading event and a start time of a latter leading event in the two adjacent leading events.

Preferably, the method of the embodiment of this application may further comprise a step of setting the interval threshold φ, so as to determine a standard for combing two leading events in a same leading session. According to factors, such as analysis requirements of persons skilled in the art, the value of the interval threshold φ may be an integer among 2 to 10 times of an update cycle of the application leaderboard. It can be understood by persons skilled in the art that, a smaller value of the interval threshold φ indicates a higher standard for combing two leading events in a same leading session.

Figure 2B:
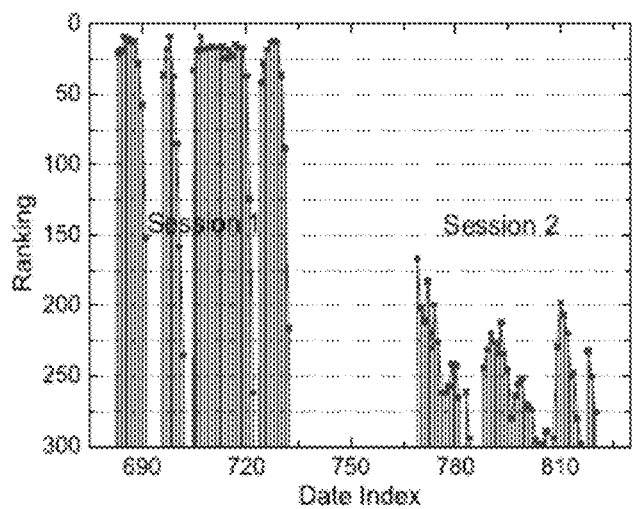
FIG. 2b shows an example of a leading session in an application leaderboard according to an embodiment of this application.

FIG. 2b shows an example of a leading session of an application. In this figure, a lateral axis represents a date index corresponding to historical ranking information, a vertical axis represents a ranking of an application, and session1 and session2 represent two leading sessions of the application appeared in the history of ranking. Each leading session is formed by multiple leading events.

According to the above literal representations on a leading session, a leading session s of an application a can be represented in a formula below:

A leading session s of an application a comprises a time range $T_s = [t_{start}^s, t_{end}^s]$ and n adjacent leading events $\{e_1, \ldots, e_n\}$, where it is satisfied that $t_{start}^s = t_{start}^{e_1}$, $t_{end}^s = t_{end}^{e_n}$, and there is not another leading session s* which enables $T_s \subset T_{s^*}$. Besides, as long as $\forall i \in [1,n)$, $(t_{start}^{e_{i+1}} - e_{end}^{e_i}) < \phi$, where φ is a preset interval threshold of a leading event, which is configured to determine an adjacent degree between leading events to comprise them in a determining standard for a same leading session.

It can be seen from the above representations that, the importance of detecting a leading session lies in combining adjacent leading events in the history of ranking of an application to form a leading session on the basis of an interval threshold φ. Specifically, in the leading session detection step of the embodiment of this application, each detected leading event is searched for starting from an initial time point of the historical ranking information in order, and when a time interval between a current leading event and a previous leading event is less than the interval threshold φ, the two leading events are combined in a same leading session until search for all detected leading events is completed, so as to detect all leading sessions of the application in the history of ranking.

It should be noted that, as a special situation, if a leading event is not adjacent to any other leading event, the leading event itself may also be considered to form a leading session. In this situation, in the leading session detection step, when a time interval between a leading event and a previous leading event is not less than the interval threshold φ, and a time interval between the leading event and a next leading event is not less than the interval threshold φ, the leading event itself is detected as a leading session.

As mentioned above, the above detected leading session represents that an application is in a relatively high ranking in an application leaderboard, that is, a period during which the application is popular with users. Detection of the leading session provides a data basis for further analyzing and processing application services. Therefore, after a leading session of an application is detected, as an exemplary embodiment of this application, information about the detected leading session of the application may also be sent to an application developer, an operator of an application store, or terminal users of the application.

An application developer can analyze a development trend of a related technical field or requirements of application users according to information about the leading session so as to guide application development and operation; an operator of an application store can further analyze a ranking fraud to obtain a false high ranking in a leaderboard in a fraudulent manner according to information about the leading session, so as to improve the operation of the application store; and terminal users of an application can select an application which satisfies their needs according to information about the leading session.

Figure 8:
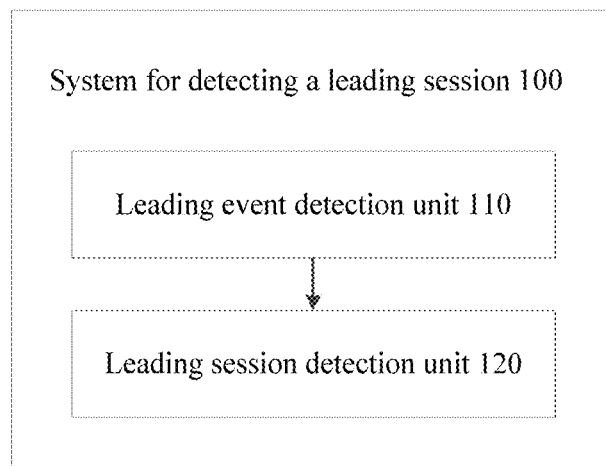
FIG. 8 is a schematic structural diagram of a system for detecting a leading session of an application according to an embodiment of this application.

As shown in FIG. 8, a system 100 for detecting a leading session of an application is also provided in an embodiment of this application. The system 100 comprises:

a leading event detection unit 110, configured to detect leading events of the application based on the historical ranking information; and a leading session detection unit 120, configured to combine adjacent leading events to form the leading session of the application.

A function of each unit in the above detection system is described below with reference to the accompanying drawings.

Because historical ranking information is a data basis for detecting a leading session of an application in this application, the detection system, as an exemplary manner of embodiments of this application, may further comprise a historical ranking information obtaining unit, configured to obtain historical ranking information of the application in an application leaderboard.

The historical ranking information obtaining unit can obtain the historical ranking information in various manners. Such as, the historical ranking information can be obtained from an operator of an application store directly, or can be extracted from data continuously published by an application store in a relatively long historical period.

The leading event detection unit 110 is configured to detect leading events of the application based on the historical ranking information.

Preferably, the system in the embodiment of this application may further comprise a ranking threshold setting unit configured to set a value of the ranking threshold K*, so as to determine a standard by which an application is in a relatively high ranking in an application leaderboard. The ranking threshold K* can take a value among integers from 1 to 500.

In an embodiment of this application, the leading event detection unit 110 may further comprise:

a start time identification unit 111, configured to identify a start time of a leading event from historical ranking information, where specifically, the start time identification unit can search for a ranking of an application at each time point in historical ranking information in order, and when a ranking at a current time point is not greater than a ranking threshold K* and a ranking at a previous time point is greater than the ranking threshold K*, identify the current time point as a start time of a leading event;

an end time identification unit 112, configured to identify a start time of a leading event from historical ranking information, where specifically, the end time identification unit can search for a ranking of an application at each time point in historical ranking information in order, and when a ranking at a current time point is greater than the ranking threshold K* and a ranking at a previous time point is not greater than the ranking threshold K*, identify the previous time point as an end time of a leading event; and a leading event identification unit 113, configured to identify a time segment between each start time and an adjacent end time after the start time as a leading event so as to detect all leading events of an application in the history of ranking.

It should be noted that, as a special situation, if an application is in top K* rankings at a first time point in an analyzed and processed historical period, for example, on a first day in a historical record, at this time, the start time identification unit defines the first time point as a start time. Similarly, if an application is still in top K* rankings at a last time point in an analyzed and processed historical period, for example, today, at this time, the end time identification unit defines the last time point as an end time.

The leading session detection unit 120 is configured to combine adjacent leading events to form the leading session of the application.

Preferably, the system of the embodiment of this application may further comprise an interval threshold setting unit configured to set a value of the interval threshold $\phi$, so as to determine a standard for combing two leading events in a same leading session. The value of the interval threshold $\phi$ may take an integer among 2 to 10 times of an update cycle of an application leaderboard.

In an embodiment of this application, the leading session detection unit 120 searches for each detected leading event starting from an initial time point of the historical ranking information in order, and when a time interval between a current leading event and a previous leading event is less than the interval threshold $\phi$, combines the two leading events into a same leading session until search for all detected leading events is completed, so as to detect all leading sessions of the application in the history of ranking.

It should be noted that, as a special situation, if a leading event is not adjacent to any other leading event, the leading event itself may also be considered to form a leading session. In this situation, the leading session detection unit 120 is configured to: when a time interval between a leading event and a previous leading event is not less than the interval threshold $\phi$, and a time interval between the leading event and a next leading event is not less than the interval threshold $\phi$, detect the leading event itself as a leading session.

As an exemplary embodiment of this application, the detection system 100 may further comprise a leading session sending unit, which sends information about the detected leading session of the application to an application developer, an operator of an application store or an application user.

Besides, as an embodiment of detecting a leading event and a leading session of an application, algorithm 1 below shows an example in which a program code of a leading session is detected in historical ranking information of a given application a.

Algorithm 1 Mining Leading Sessions

Input 1: a's historical ranking records $R_a$;
Input 2: the ranking threshold $K^*$; the merging threshold $\phi$;
Output: the set of a's leading sessions $S_a$;
Initialization: $S_a = \emptyset$;
1:  $E_a = \emptyset$; $e = \emptyset$; $s = \emptyset$; $t_{start}^e = 0$;
2:  for each $i \in [1, |R_a|]$ do
3:      if $r_i^a \leq K^*$ and $t_{start}^e == 0$ then
4:          $t_{start}^e = t_i$;
5:      else if $r_i^a > K^*$ and $t_{start}^e \neq 0$ then
6:          //found one event;
7:          $t_{end}^e = t_{i-1}$; $e = <t_{start}^e, t_{end}^e>$
8:          if $|E_a| == \emptyset$ then
9:              $E_a \cap = e$; $t_{start}^s = t_{start}^e$; $t_{end}^s = t_{end}^e$;
10:         else if $|E_a| > 1$ and $(t_{start}^e - t_{end}^{e*}) < \phi$ then
11:             //$e^*$ is the last Leading event before e in $E_a$;
12:             $E_a \cup = e$; $t_{end}^s = t_{end}^e$;
13:         else then //found one session;
14:             $s = <t_{start}^s, t_{end}^s, E_a>$;
15:             $S_a \cup = s$; $E_a = \emptyset$; $s = \emptyset$ is a new session;
16:             go to Step 7;
17:         $t_{start}^e = 0$; $e = \emptyset$ is a new leading event;
18: return $S_a$ and a leading session s is defined as $\langle t_{start}^s, t_{end}^s, E_s \rangle$, where $E_s$ is a set of leading events in a leading session s. Specifically, each leading event e of an application a is extracted from a start time of historical ranking information (step 2 to step 5 in algorithm 1). For each extracted leading event e, a time interval between the leading event e and a previous leading event $e^*$ is detected to determine whether they belong to a same leading session. Specifically, if $(t_{start}^e - e_{end}^{e*}) \geq \phi$, a leading event e is considered to belong to a new leading session (step 7 to step 13 in algorithm 1). In this way, the above algorithm 1 can identify a leading event and a leading session by scanning historical ranking information of an application a once.

EMBODIMENT

Data of this embodiment is collected from "TOP300 free application leaderboard" and "TOP300 paid application leaderboard" of the American Apple APP Store, and involves historical record information of applications in top 300 rankings in the two leaderboards which are updated daily from Feb. 2, 2010 to Sep. 17, 2012. The historical record information comprises daily ranking information of these applications, corresponding user rating information and the like.

Figure 3A:
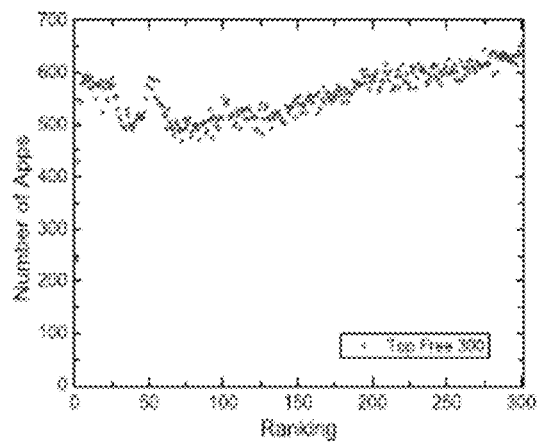
FIG. 3a is a distribution diagram of the numbers of applications in different rankings in a free application leaderboard according to an embodiment of this application.
Figure 3B:
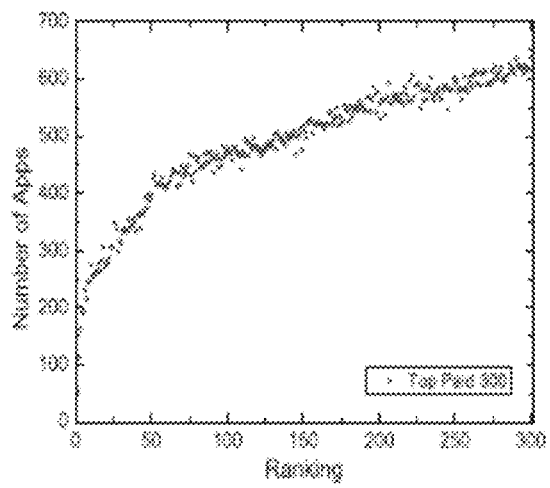
FIG. 3b is a distribution diagram of the numbers of applications in different rankings in a paid application leaderboard according to an embodiment of this application.

FIG. 3a and FIG. 3b respectively show distribution situations of the numbers of applications against different rankings in the free application leaderboard and the paid application leaderboard. In the figures, a lateral axis represents a ranking of an application and a vertical axis represents the number of applications. It can be seen from the figures that, the number of applications with relatively lower rankings is greater than the number of applications with relatively higher rankings. Moreover, a competition among free applications is fiercer than that among paid applications, especially a high ranking competition among top 25 rankings.

Figure 4A:
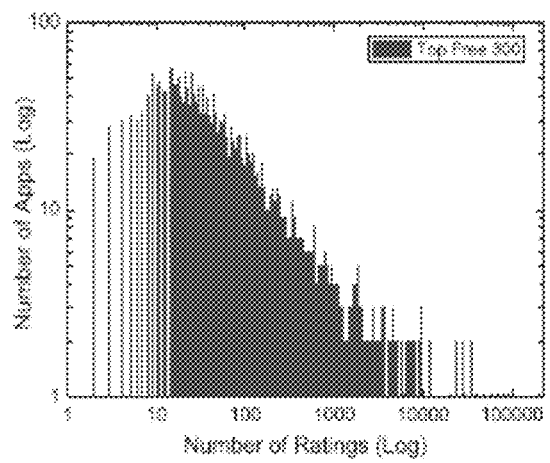
FIG. 4a is a distribution diagram of the numbers of applications on different numbers of ratings in a free application leaderboard according to an embodiment of this application.
Figure 4B:
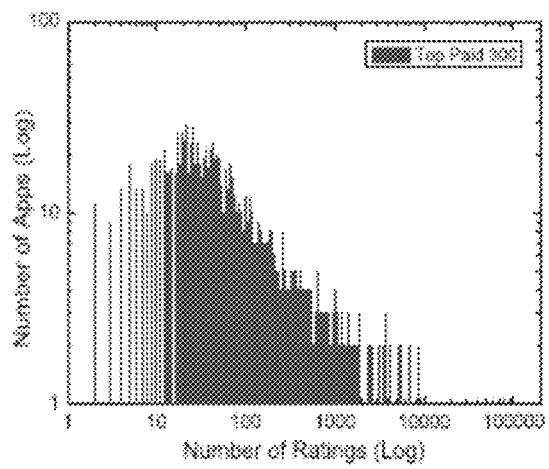
FIG. 4b is a distribution diagram of the numbers of applications on different numbers of ratings in a paid application leaderboard according to an embodiment of this application.

FIG. 4a and FIG. 4b respectively show distribution situations of the numbers of applications against different numbers of ratings in the free application leaderboard and the paid application leaderboard. In the figures, a lateral axis represents the number of ratings (Log) and a vertical axis represents the number of applications (Log). It can be seen from the figures that, a distribution of the numbers of ratings on an application is not even, which indicates that only a small part of applications are very popular.

Here, embodiments are used to show results of detecting leading sessions of applications in the above two application leaderboards. Specifically, in this embodiment, a ranking threshold $K^*$ is set to 300 and an interval threshold $\phi$ is set to 7, which indicates that, if an interval of two adjacent leading events is within one week, they can be combined in a same leading session.

Figure 5A:
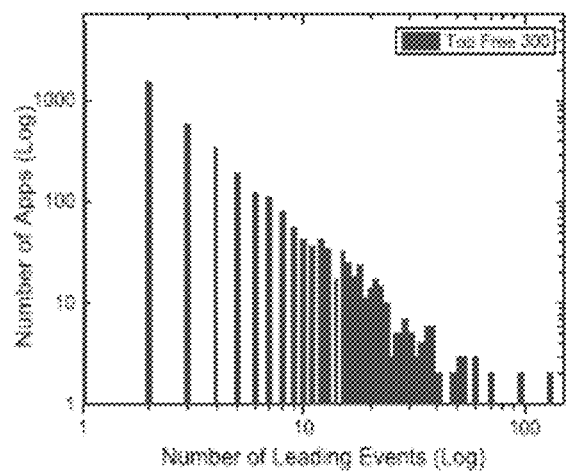
FIG. 5a is a distribution diagram of the numbers of applications on the number of leading events in a free application leaderboard according to an embodiment of this application.
Figure 5B:
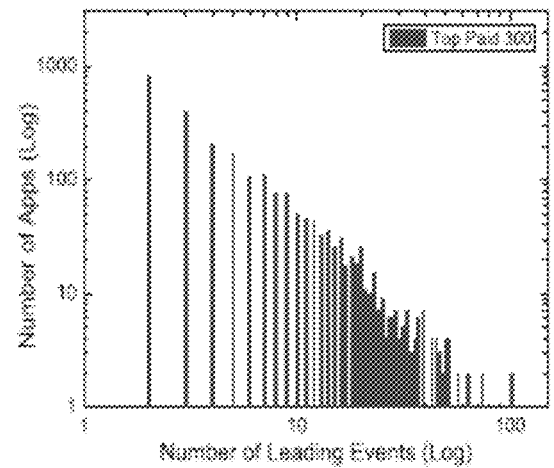
FIG. 5b is a distribution diagram of the numbers of applications on the number of leading events in a paid application leaderboard according to an embodiment of this application.
Figure 6A:
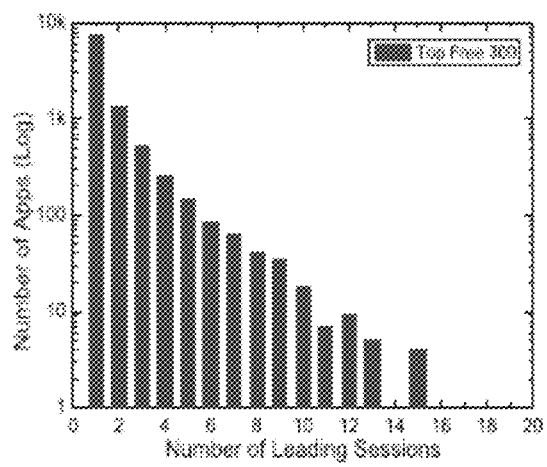
FIG. 6a is a distribution diagram of the numbers of applications on the number of leading sessions in a free application leaderboard according to an embodiment of this application.
Figure 6B:
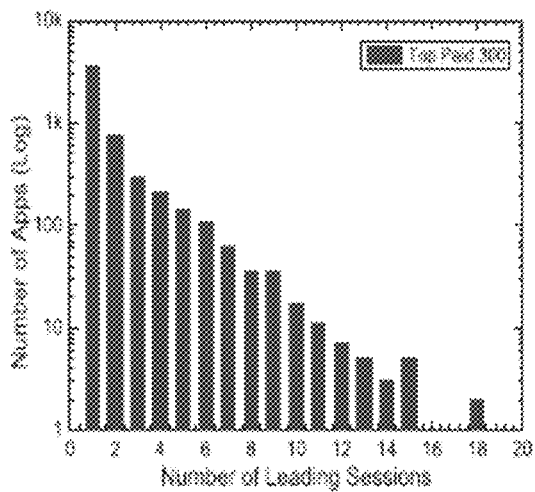
FIG. 6b is a distribution diagram of the numbers of applications on the number of leading sessions in a paid application leaderboard according to an embodiment of this application.

FIG. 5a and FIG. 5b respectively show distribution situations of the numbers of applications against the numbers of leading events in the free application leaderboard and the paid application leaderboard. In the figures, a lateral axis represents the number of leading events (Log) and a vertical axis represents the number of applications (Log). FIG. 6a and FIG. 6b respectively show distribution situations of the numbers of applications against the numbers of leading sessions in the free application leaderboard and the paid application leaderboard. In the figures, a lateral axis represents the number of leading sessions and a vertical axis represents the number of applications (Log). It can be seen from the figures that, only a few applications have many leading events and many leading sessions. For a free application, the average number of leading events and the average number of leading sessions are respectively 2.69 and 1.57, and for a paid application, the two numbers are 4.20 and 1.86.

Figure 7A:
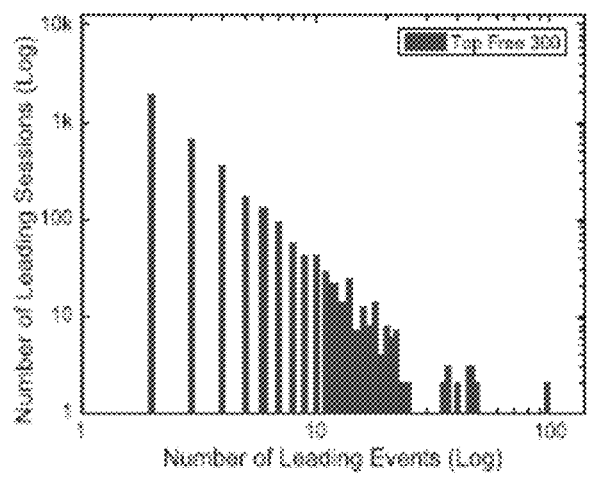
FIG. 7a is a distribution diagram of the numbers of leading sessions comprising different numbers of leading events in a free application leaderboard according to an embodiment of this application.
Figure 7B:
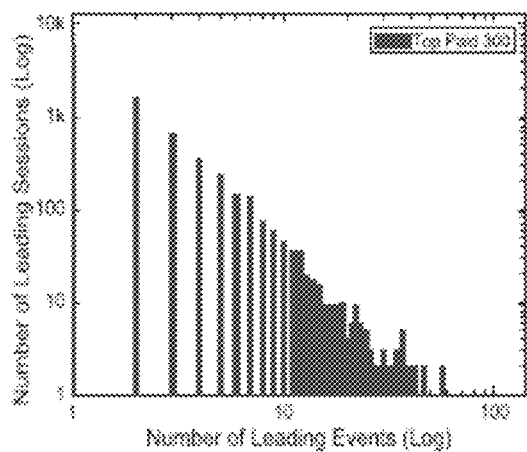
FIG. 7b is a distribution diagram of the numbers of leading sessions comprising different numbers of leading events in a paid application leaderboard according to an embodiment of this application.

Besides, FIG. 7a and FIG. 7b respectively show distribution situations of the numbers of leading sessions comprising different numbers of leading events in the free application leaderboard and the paid application leaderboard. In the figures, a lateral axis represents the number of leading events (Log) and a vertical axis represents the number of leading sessions (Log). It can be seen from the figures that, only a few leading sessions comprise many leading events. In fact, for a free application, the average number of leading events comprised in a leading session is 1.70 and for a paid application, the number is 2.26.

Figure 9:
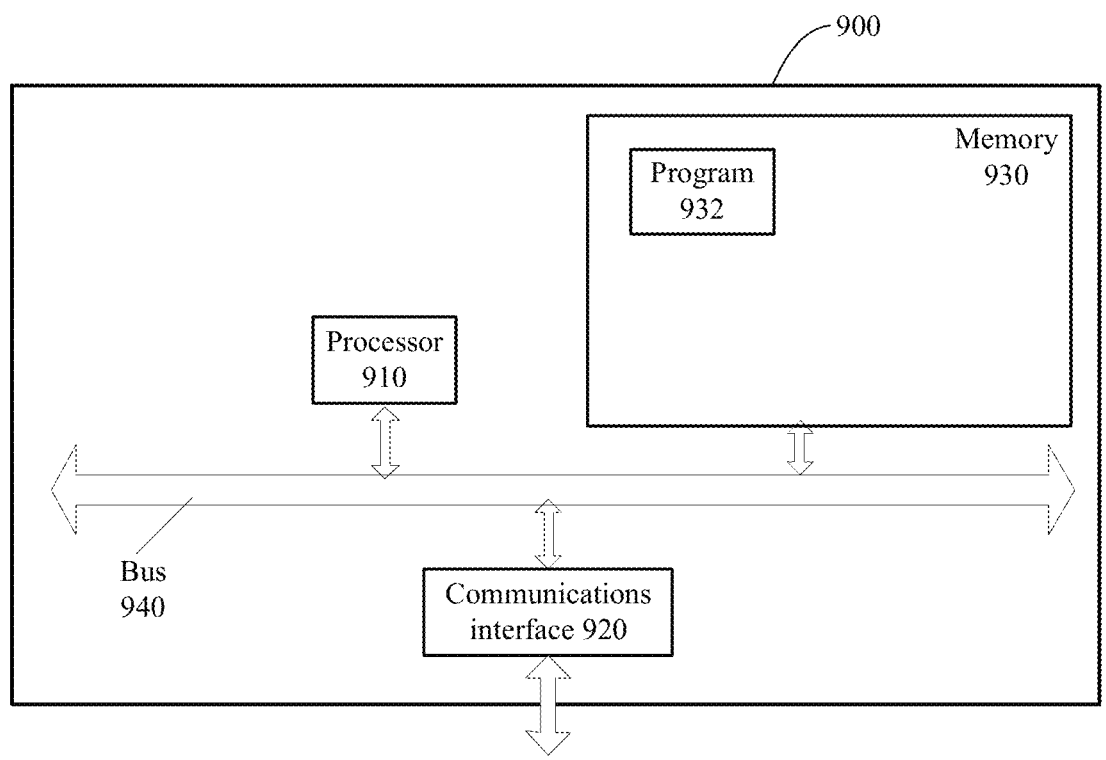
FIG. 9 is a schematic structural diagram of a system for detecting a leading session of an application according to another embodiment of this application.

FIG. 9 is a schematic structural diagram of a system 900 for detecting a leading session provided by an embodiment of this application. The specific embodiment of this application is not intended to limit a specific implementation of the system 900 for detecting a leading session. As shown in FIG. 9, the system 900 for detecting a leading session may comprise:

a processor 910, a communications interface 920, a memory 930, and a communications bus 940.

The processor 910, the communications interface 920, and the memory 930 complete mutual communications via the communications bus 940.

The communications interface 920 is configured to be in communication with a network element, such as a client.

The processor 910 is configured to execute a program 932, and specifically can implement related functions of the system for detecting a leading session.

Specifically, the program 932 may comprise a program code. The program code comprises a computer operation instruction.

The processor 910 may be a central processing unit (CPU), an application specific integrated circuit (ASIC), or one or more integrated circuits which are configured to implement embodiments of this application.

The memory 930 is configured to store the program 932. The memory 930 may comprise a high-speed RAM memory, and may also comprise a non-volatile memory, for example, at least one magnetic disk memory. The program 932 specifically may comprise:

a leading event detection unit, configured to detect leading events of the application based on the historical ranking information; and a leading session detection unit, configured to combine adjacent leading events to form the leading session of the application.

For a specific implementation of each unit in the program 932, reference may be made to a corresponding unit in the embodiment shown in FIG. 8, which is not further described therein.

It can be clearly understood by persons skilled in the art that, for the purpose of convenient and brief description, as for a specific working process of the foregoing device and module, reference can be made to the corresponding description in the foregoing apparatus embodiments, and the details are not described herein again.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and comprises several instructions for instructing a computer device (which may be a personal computer, a server, a network device, and the like) to perform all or a part of the steps of the method described in the embodiment of this application. The foregoing storage medium comprises: any medium that can store program codes, such as a USB flash disk, a removable hard disk, a read-only memory (ROM), a random access memory (RAM), a magnetic disk, or an optical disk.

The foregoing embodiments are merely intended for describing this application rather than limiting this application. A person of ordinary skill in the art should understand that modifications and variations may still be made without departing from the spirit and scope of this application. Therefore, all equivalent technical solutions shall fall within the scope of this application, and the patent protection scope of this application shall be subject to the claims.

What is claimed is:

1. A method, comprising:
   detecting, by a device comprising a processor, leading events of an application based on historical ranking information, wherein the leading events are the time segments during which the application remains in at least a predefined high ranking in an application leaderboard, and a standard for at least the predefined high ranking is that a ranking of the application in the application leaderboard is not greater than a ranking threshold K*, and the detecting the leading events of the application comprises:
   identifying start times of the leading events and adjacent end times of the leading events that are adjacent to the start times, wherein the leading events are separately formed by connecting ranking points during a leading even, and
   based on a result of searching for rankings of the application at time points represented in the historical ranking information, identifying time segments between the start times and the adjacent end times as corresponding to the leading events, wherein the historical ranking information comprises a ranking index corresponding to a discrete date index, and wherein each element in the ranking index corresponds to a discrete time point in the discrete date index, and represents a ranking of the application when the application is at the discrete time point;
   in response to a time interval of two adjacent leading events of the adjacent leading events being determined to be less than an interval threshold, combining adjacent leading events of the leading events to form leading sessions of the application, wherein the adjacent leading events comprise at least two consecutive time segments of the time segments; and
   sending the leading session of the application to at least one of at least one device of an application developer, an operator of an application store or an application user.

2. The method of claim 1, further comprising:
   setting the ranking threshold K*.

3. The method of claim 1, wherein a value of the ranking threshold K* is in a range of integers between 1 and 500.

4. The method of claim 1, further comprising:
   setting the interval threshold.

5. The method of claim 1, wherein a value of the interval threshold is in a range of 2 to 10 times of an update cycle of the application leaderboard.

6. The method of claim 1, wherein
   if a first ranking of the application at a first time point in the historical ranking information is not greater than the ranking threshold K*, identifying the first time point as a start time; and
   if a second ranking of the application at a last time point in the historical ranking information is not greater than the ranking threshold K*, identifying the last time point as an adjacent end time of the adjacent end times.

7. The method of claim 1, wherein the combining the adjacent leading events of the leading events to form the leading sessions of the application comprises:
   searching, in an order of the adjacent leading events, for a detected leading event starting from an initial time point of the historical ranking information in; and
   when a time interval between a current leading event and a previous leading event is less than an interval threshold, combining the current leading event and the previous leading event in a same leading session until the searching for the detected leading event is completed.

8. The method of claim 7, wherein the combining the adjacent leading events of the leading events to form the leading sessions of the application further comprises:
   when the time interval between the current leading event and the previous leading event is not less than the interval threshold, and another time interval between the current leading event and a next leading event is not less than the interval threshold, detecting the detected leading event as a leading session of the leading sessions.

9. The method of claim 1, wherein the time segments are first time segments, and wherein the historical ranking information comprises information about ratings on the application by users of the application in second time segments in the history.

10. The method of claim 1, further comprising:
obtaining the historical ranking information of the application in an application leaderboard.

11. The method of claim 10, wherein the obtaining the historical ranking information comprises at least one of obtaining the historical ranking information from a device of an operator of an application store or extracting the historical ranking information from data received from the application store.

12. The method of claim 1, further comprising:
when a first ranking at a current time point is not greater than a ranking threshold K* and a second ranking of the rankings at a previous time point is greater than the ranking threshold K*, identifying the current time point as a start time of the leading event of the start times of the leading events; and
when a first ranking at a current time point is greater than the ranking threshold K* and a second ranking of the rankings at a previous time point is not greater than the ranking threshold K*, identifying the previous time point as an adjacent end time of the adjacent end times.

13. A system, comprising:
a memory that stores executable units; and
a processor, coupled to the memory, that executes the executable units to perform operations of the system, the executable units comprising:
a leading event detection unit configured to detect leading events of an application based on historical ranking information, wherein the leading events are the time segments during which the application remains in at least a predefined high ranking in an application leaderboard, and a standard for at least the predefined high ranking is that a ranking of the application in the application leaderboard is not greater than a ranking threshold K*, and the leading event detection unit comprises:
a start time identification module configured to identify start times of the leading events,
an end time identification module configured to identify adjacent end times of the leading events, which are adjacent to the start times, wherein the leading events are separately formed by connecting ranking points during a leading event, and
a leading event identification module configured to, based on a result of searching for rankings of the application at time points represented in the historical ranking information, identify time segments between the start times and the adjacent end times as the leading events, wherein the historical ranking information comprises a ranking index corresponding to a discrete date index, and wherein each element in the ranking index corresponds to a discrete time point in the discrete date index, and represents a ranking of the application when the application is at the discrete time point;
a leading session detection unit configured to, in response to a time interval of two adjacent leading events of the adjacent leading events being determined to be less than an interval threshold, combine adjacent leading events of the leading events to form a leading session of the application, wherein the adjacent leading events comprise at least two consecutive time segments of the time segments; and
a leading session sending unit configured to send the leading session of the application to at least one of at least one device of an application developer, an operator of an application store or an application user.

14. The system of claim 13, wherein the executable units further comprise a ranking threshold setting unit configured to set the ranking threshold K*.

15. The system of claim 13, wherein a standard for combining the adjacent leading events in a same leading session is that a time interval of the adjacent leading events is less than an interval threshold.

16. The system of claim 15, wherein the executable units further comprise an interval threshold setting unit configured to set the interval threshold.

17. The system of claim 13, wherein
the start time identification module is further configured to identify a first time point as a start time of the start times if a first ranking of the application at the first time point in the historical ranking information is not greater than a ranking threshold; and
the end time identification module is further configured to identify a last time point as an adjacent end time of the adjacent end times if a last ranking of the application at the last time point in the historical ranking information is not greater than the ranking threshold.

18. The system of claim 13, wherein the leading session detection unit is further configured to:
search, in time order, for the leading events starting from an initial time point of the historical ranking information; and
when a time interval between a current leading event and a previous leading event is less than an interval threshold, combine the adjacent leading events in a same leading session until the search for the leading events is completed.

19. The system of claim 18, wherein the leading session detection unit is configured to detect a leading event of the leading events as the leading session when a first time interval between the leading event and the previous leading event is not less than the interval threshold, and a second time interval between the leading event and a next leading event is not less than the interval threshold.

20. The system of claim 13, wherein the executable units further comprise a historical ranking information obtaining unit configured to obtain the historical ranking information of the application in an application leaderboard.

21. The system of claim 20, wherein the historical ranking information obtaining unit is configured to at least one of obtain the historical ranking information from a device of an operator of an application store or extract the historical ranking information from data published by the application store.

22. The system of claim 13, wherein
when a first ranking at a current time point is not greater than the ranking threshold K* and a second ranking of the rankings at a previous time point is greater than a ranking threshold K*, the start time identification module is further configured to identify the current time point as a start time of the leading event of the start times of the leading events; and
when a first ranking at a current time point is greater than the ranking threshold K* and a second ranking of the rankings at a previous time point is not greater than the ranking threshold K*, the end time identification module is further configured to identify the previous time point as an adjacent end time of the adjacent end times.

23. The system of claim 13, wherein a value of the interval threshold is in a range of 2 to 10 times of an update cycle of the application leaderboard.

24. A non-transitory computer readable storage device, comprising at least one executable instruction, which, in response to execution, causes a system comprising a processor to perform operations, comprising:
- detecting leading events of an application based on historical ranking information, wherein the leading events are the time segments during which the application remains in at least a predefined high ranking in an application leaderboard, and a standard for at least the predefined high ranking is that a ranking of the application in the application leaderboard is not greater than a ranking threshold K*, and the detecting the leading events of the application comprises:
  - identifying start times of the leading events and adjacent end times of the leading events, wherein the adjacent end times are adjacent to the start times, wherein the leading events are separately formed by connecting ranking points during a leading event, and
  - based on a result of searching for rankings of the application at time points represented in the historical ranking information, identifying time segments between the start times and the adjacent end times as the leading events, wherein the historical ranking information comprises a ranking index corresponding to a discrete date index, and wherein each element in the ranking index corresponds to a discrete time point in the discrete date index, and represents a ranking of the application when the application is at the discrete time point;
- combining adjacent leading events of the leading events to form leading sessions of the application, wherein the adjacent leading events comprise at least two consecutive time segments of the time segments, and
- sending the leading session of the application to at least one of at least one device of an application developer, an operator of an application store or an application user.

25. The non-transitory computer readable storage device of claim 24, wherein the operations further comprise:
- setting the ranking threshold K*.

26. The non-transitory computer readable storage device of claim 25, wherein a value of the ranking threshold K* is in a range of integers between 1 and 500.

27. The non-transitory computer readable storage device of claim 24, wherein the operations further comprise:
- in response to a time interval of two adjacent leading events of the adjacent leading events being determined to be less than an interval threshold, combining the two adjacent leading events in a same leading session.

28. The non-transitory computer readable storage device of claim 24, wherein the operations further comprise:
- setting the interval threshold.

29. The non-transitory computer readable storage device of claim 24, wherein a value of the interval threshold is in a range of 2 to 10 times of an update cycle of the application leaderboard.

30. The non-transitory computer readable storage device of claim 24, wherein the time segments are first time segments, and wherein the historical ranking information comprises information about ratings on the application by users of the application in second time segments in the history.

31. The non-transitory computer readable storage device of claim 24, wherein the operations further comprise:
- obtaining the historical ranking information of the application in an application leaderboard.

32. The non-transitory computer readable storage device of claim 31, wherein the obtaining the historical ranking information comprises at least one of obtaining the historical ranking information from a device of an operator of an application store or extracting the historical ranking information from data received from the application store.

* * * * *